(12) United States Patent
Chang et al.

(10) Patent No.: US 10,048,360 B2
(45) Date of Patent: Aug. 14, 2018

(54) ULTRASOUND IMAGING SYSTEM AND METHOD THEREOF, AND BEAMFORMING CIRCUIT

(71) Applicant: INDUSTRIAL TECHNOLOGY RESEARCH INSTITUTE, Hsinchu (TW)

(72) Inventors: Chih-Chi Chang, Hsinchu (TW); Yi-Jung Wang, Kaohsiung (TW); Guo-Zua Wu, Taichung (TW); Oscal Tzyh-Chiang Chen, Minxiong Township (TW); Chien-Ju Li, Zhubei (TW); Ji-Da Chen, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 373 days.

(21) Appl. No.: 14/861,505

(22) Filed: Sep. 22, 2015

(65) Prior Publication Data

US 2016/0187472 A1    Jun. 30, 2016

(30) Foreign Application Priority Data

Dec. 29, 2014 (TW) ............... 103146049 A (51) Int. Cl.
*G01S 7/52* (2006.01)
*G01S 15/89* (2006.01)
*G10K 11/34* (2006.01)

(52) U.S. Cl.
CPC ...... *G01S 7/52028* (2013.01); *G01S 15/8915* (2013.01); *G10K 11/346* (2013.01)

(58) Field of Classification Search
CPC ............ G01S 7/52028; G01S 15/8915; G10K 11/346

See application file for complete search history.

(56) References Cited

U.S. PATENT DOCUMENTS 5,970,025 A    10/1999    Cole et al.
7,804,736 B2    9/2010    Alexandru
(Continued)

FOREIGN PATENT DOCUMENTS

TW    I409452 B1    9/2013
TW    201344188 A    11/2013
(Continued)

OTHER PUBLICATIONS

Cao et al., "Design of a Real Time Digital Beamformer for 50MHz Annular Array Ultrasound Transducer", 2002 IEEE Ultrasonics Symposium, pp. 1619-1622.
(Continued)

*Primary Examiner* — Daniel T Pihulic
(74) *Attorney, Agent, or Firm* — Birch, Stewart, Kolasch & Birch, LLP (57) ABSTRACT

An ultrasound imaging system includes a beam receiving circuit and a back-end circuit. The beam receiving circuit receives a plurality of digitized echo signals. The back-end circuit is coupled to the beam receiving circuit for outputting a plurality of compressed delay timing parameters corresponding to a plurality of channels to the beam receiving circuit. The beam receiving circuit decompresses the compressed delay timing parameters into a plurality of delay timing parameters, and processes the digitized echo signals into an ultrasound beamforming value according to the delay timing parameters corresponding to the channels. The back-end circuit synthesizes an ultrasound image according to the ultrasound beamforming value outputted from the beam receiving circuit.

13 Claims, 6 Drawing Sheets

(56) References Cited

U.S. PATENT DOCUMENTS

| | | |
|---|---|---|
| 8,157,738 B2 | 4/2012 | Wegener et al. |
| 8,416,643 B2 | 4/2013 | Magee |
| 8,457,579 B2 | 6/2013 | Mishali et al. |
| 8,568,321 B2 | 10/2013 | Lim et al. |
| 8,795,180 B2 | 8/2014 | Wegener et al. |
| 2002/0082500 A1 | 6/2002 | Henderson et al. |
| 2007/0016049 A1* | 1/2007 | Kye .................. G01S 7/52017 600/447 |
| 2016/0187472 A1* | 6/2016 | Chang ................ G01S 7/52028 367/11 |

FOREIGN PATENT DOCUMENTS

| | | |
|---|---|---|
| TW | I1440878 B | 6/2014 |
| TW | I453404 B | 9/2014 |

OTHER PUBLICATIONS

Feldkamper et al., "Low Power Delay Calculation for Digital Beamforming in Handheld Ultrasound Systems", 2000 IEEE Ultrasonics Symposium, pp. 1763-1766.

Freeman et al., "Delta-sigma oversampled Ultrasound Beamformer with Dynamic Delays", IEEE Transactions on Ultrasonics, Ferroeletrics, and Frequency Control, Mar. 1999, vol. 46, No. 2, pp. 320-332.

Hazard et al., "Developing a High Speed Beamformer Using the TMS320C6201 Digital Signal Processor", 2000 IEEE Ultrasonics Symposium, pp. 1755-1758.

Hu et al., "Design of a 64-channel Digital High Frequency Linear Array Ultrasound Imaging Beamformer on a Massively Parallel Processor Array", 2008 IEEE International Ultrasonics Symposium Proceedings, pp. 1266-1269.

Ma et al., "Software-based Ultrasound Phase Rotation Beamforming on Multi-core DSP", 5 pages.

Manes et al., "Design of a Simplified Delay System for Ultrasound Phased Array Imaging", IEEE Transctions on Sonics and Ultranonics, Nov. 1983, vol. SU-30, No. 6, pp. 350-354.

Park et al., "A Real-time Synthetic Aperture Beamformer for Medical Ultrasound Imaging", 2010 IEEE International Ultrasonics Symposium Proceedings, pp. 1992-1995.

Park et al., "Efficient Implementation of a real-time Dynamic Synthetic Aperture Beamformer", 2012 IEEE International Ultrasonics Symposium Proceedings, pp. 2250-2253.

Sawkar et al., "Area and Delay Mapping for Table-Look-Up Based Field Programmable Gate Arrays", 1992 IEEE, 29th ACM/IEEE Design Automation Conference@, pp. 368-373.

* cited by examiner

ULTRASOUND IMAGING SYSTEM AND METHOD THEREOF, AND BEAMFORMING CIRCUIT

This application claims the benefit of Taiwan application Serial No. 103146049, filed Dec. 29, 2014, the disclosure of which is incorporated by reference herein in its entirety.

TECHNICAL FIELD

The disclosure relates in general to an ultrasound imaging system and method thereof, and a beamforming circuit.

BACKGROUND

Ultrasound has great use in medical practices. The practice of using ultrasound to scan internal organs may assist medical diagnosis and treatments. Besides, obstetric ultrasound is often used in pregnant inspection.

In recent years, miniaturized ultrasound system is getting more and more important in the market. Moreover, a hardware design method to achieve low power consumption is a valuable technology in the miniaturization of the ultrasound system. For an ultrasound system may collaborate with different probes or is adapted for different scanning modes, the same ultrasound system may be used in various fields and the cost is reduced.

SUMMARY

The disclosure is directed to an ultrasound imaging system and method thereof, and a beamforming circuit. The disclosure is benefic by disposing a large memory (which is for storing plenty of delay time tables) on a back-end circuit, and hence reducing the circuit area and power consumption for the beam receiving circuit.

According to one embodiment, an ultrasound imaging system including a beam receiving circuit and a back-end circuit is provided. The beam receiving circuit receives a plurality of digitized echo signals. The back-end circuit is coupled to the beam receiving circuit for outputting a plurality of compressed delay timing parameters corresponding to a plurality of channels to the beam receiving circuit. The beam receiving circuit decompresses the compressed delay timing parameters into a plurality of delay timing parameters, and processes the digitized echo signals into an ultrasound beamforming value according to the delay timing parameters corresponding to the channels. The back-end circuit generates an ultrasound image according to the ultrasound beamforming value outputted from the beam receiving circuit.

According to another embodiment, a beamforming circuit including a digital interface, a first memory, a decompression-decoding unit, a second memory, a beamforming computation circuit is provided. The digital interface receives a plurality of compressed delay timing parameters transmitted from a back-end circuit. The first memory buffers the compressed delay timing parameters transmitted from the digital interface. The decompression-decoding unit decompresses and decodes the compressed delay timing parameters buffered in the first memory into a plurality of delay timing parameters. The second memory buffers the delay timing parameters decompressed and decoded by the decompression-decoding unit. The beamforming computation circuit performs beamforming computation on a plurality of digitized echo signals according to the delay timing parameters corresponding to a plurality of channels, to obtain an ultrasound beamforming value.

According to an alternative embodiment, an ultrasound beamforming method is provided. The method includes: when a plurality of array elements receive a plurality of digitized echo signals, reading a plurality of pre-stored compressed delay timing parameters from a memory and decompressing the pre-stored compressed delay timing parameters into a plurality of delay timing parameters; performing beamforming computation on the digitized echo signals received by the array elements to obtain an ultrasound beamforming value according to the decompressed delay timing parameters; and converting the ultrasound beamforming value into an image signal and displaying an ultrasound image after performing image processing on the image signal.

The above and other contents of the invention will become understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 1:
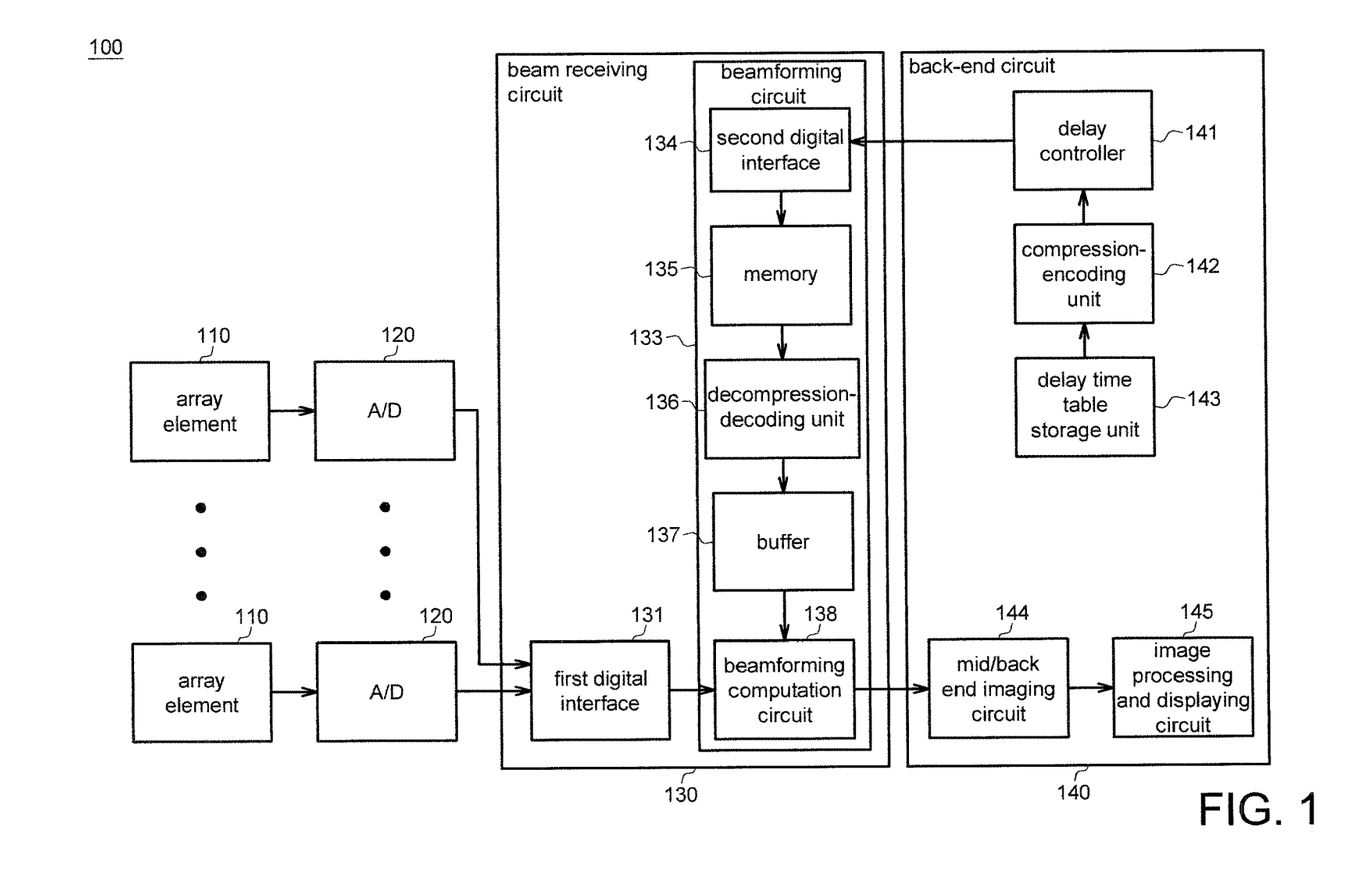
FIG. 1 is a functional block diagram of an ultrasound imaging system according to an embodiment of the present disclosure.

Referring to FIG. 1, a functional block diagram of an ultrasound imaging system according to an embodiment of the present disclosure is shown. As indicated in FIG. 1, the ultrasound imaging system 100 includes a plurality of array elements 110, a plurality of analog-to-digital converters 120, a beam receiving circuit 130 and a back-end circuit 140. The beam receiving circuit 130 includes a first digital interface 131 and a beamforming circuit 133. The beamforming circuit 133 includes a second digital interface 134, a memory 135, a decompression-decoding unit 136, a buffer 137 and a beamforming computation circuit 138. The back-end circuit 140 includes a delay controller 141, a compression-encoding unit 142, a delay time table storage unit 143, a mid/back end imaging circuit 144 and an image processing and displaying circuit 145.

The array elements 110 form a plurality of channels for receiving analog echo signals reflected from an object and further transmit the analog echo signals to the analog-to-digital converters 120, which converter the received analog echo signals into digitized echo signals.

The beam receiving circuit 130 receives the digitized echo signals from the analog-to-digital converters 120 and further processes the digitized echo signals into an ultrasound beamforming value according to the respective delay timing parameter corresponding to each channel.

The back-end circuit 140 outputs the compressed delay timing parameter corresponding to each channel to the beam receiving circuit 130. Besides, the back-end circuit 140 further generates an ultrasound image according to the ultrasound beamforming value outputted from the beam receiving circuit 130.

The first digital interface 131 of the beam receiving circuit 130 receives the digitized echo signals converted by the analog-to-digital converters 120. The beamforming circuit 133 of the beam receiving circuit 130 synthesizes and/or generates the ultrasound beamforming value from the digitized echo signals.

The second digital interface 134 of the beamforming circuit 133 receives the compressed delay timing parameters from the delay controller 141 of the back-end circuit 140 and further stores the compressed delay timing parameters to the memory 135. After the decompression-decoding unit 136 decompresses and decodes the compressed delay timing parameters buffered in the memory 135, the decompression-decoding unit 136 stores the decompressed and decoded delay timing parameters to the buffer 137. The buffer 137 assures a stable access rate of time parameters.

The beamforming computation circuit 138 processes the digitized echo signals (for example, by using delay and sum (DAS) processing) to obtain the ultrasound beamforming value according to the decompressed and decoded delay timing parameters corresponding to each channel. Detailed operations of the beamforming computation circuit 138 are not subjected to particular restrictions here.

For example, the beamforming computation circuit 138 performs DAS processing on the echo signal received by each channel. The reason for using the DAS processing is as follows. Since the signal path length between the focus point and each channel of the probe may not be the same, the echo signals received by each channel are compensated by the delay timing parameters such that the echo signals received by each channel may be accumulated at the same time point to obtain the ultrasound beamforming value.

The delay time table storage unit 143 of the back-end circuit 140 stores uncompressed delay time tables and/or imaging parameters (the imaging parameters may be used by the beamforming computation circuit 138). The compression-encoding unit 142 compresses the delay time table buffered in the delay time table storage unit 143 and then transmits to the delay controller 141. On the other hand, the delay controller 141 controls the delay time table storage unit 143 to output a suitable delay time table according to the type and/or the scan mode of the array elements on the probe (not illustrated).

The mid/back end imaging circuit 144 converts the ultrasound beamforming value obtained by the beamforming computation circuit 138 into an image signal. The image processing and displaying circuit 145 performs image processing on the image signal obtained by the mid/back end imaging circuit 144 and displays.

In an embodiment of the present disclosure, the compression-encoding unit 142 employs lossless compression. Differential pulse code modulation (DPCM) is an applicable compression algorithm. Moreover, in respect of the characteristics of the delay time table, data compressed by DPCM have similar values. Therefore, data compressed by DPCM may further be compressed by run-length coding to reduce the size of the compressed data. Compression method affects the complexity of the decompression-decoding unit, that is, affects the cost and power consumption of the hardware. The DPCM and the run-length coding are simple compression methods, which are suitable in the embodiment of the application. In addition, the decompression of the decompression-decoding unit 136 may be simple and suitable to be implemented by hardware.

In the embodiment of the present disclosure, before the ultrasound imaging system 100 is booted, the delay time table was stored in the back-end circuit 140 instead of the beam receiving circuit 130. The back-end circuit 140 stores several delay time tables. After the ultrasound imaging system 100 is booted, one or more of the delay time tables or a part of the delay time table may be compressed, transmitted and loaded to the beam receiving circuit 130 to be buffered in the memory 135. In general, the uncompressed delay time table has a large data size and requires a large memory space. If the beam receiving circuit 130 is implemented as an application-specific integrated circuit (ASIC), the circuit area of the ASIC may be greatly reduced because the memory for storing complete uncompressed delay time table is not disposed in the ASIC.

Moreover, the algorithm for forming ultrasound beam is more flexible. That is, the delay time table may be calculated off-line by advanced algorithm, and then the delay time table is transmitted and stored to the back-end circuit. Off-line calculation of delay time table has the advantage of using more precise algorithms.

The hardware configuration with low power consumption is indispensable to the miniaturization of ultrasound system. The beam receiving circuit implemented by field programmable gate array (FPGA) is disadvantaged in that the power consumption and cost of FPGA is higher than that of ASIC. Also, the beam receiving circuit occupies a large area in the ultrasound imaging system. In the embodiment of the present disclosure, the beam receiving circuit is implemented by ASIC to reduce the cost and power consumption.

Different ultrasound probe specifications and/or different scanning modes correspond to different delay timing parameters. How to quickly update the delay time table is an important technology for the (miniaturized) ultrasound system to be applicable to various ultrasound probe specifications and/or scanning modes. Since the embodiment of the present disclosure are capable of updating the stored delay time tables and/or imaging parameters according to actual needs, the (miniaturized) ultrasound system of the embodiments of the present disclosure is applicable to various ultrasound probe specifications and/or scanning modes.

Figure 2:
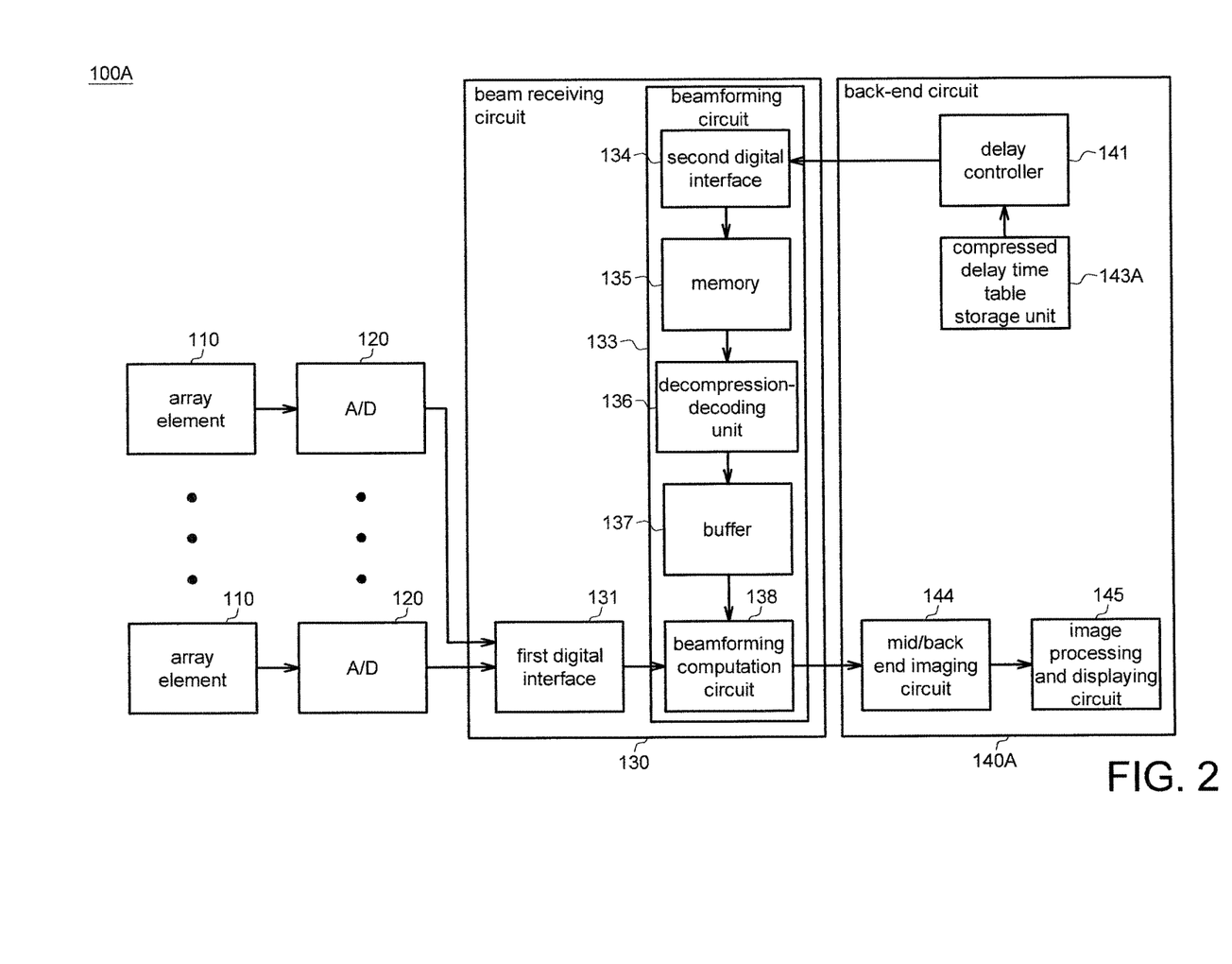
FIG. 2 is a functional block diagram of an ultrasound imaging system according to another embodiment of the present disclosure.

Referring to FIG. 2, a functional block diagram of an ultrasound imaging system 100A according to another embodiment of the present disclosure is shown. The ultrasound imaging system 100A of FIG. 2 is different from the ultrasound imaging system 100 of FIG. 1 in that compressed delay time tables are stored in the storage unit 143A of the back-end circuit 140A. Therefore, the back-end circuit 140A does not require any compression-encoding units, and the cost may be further reduced. Moreover, the storage unit 143A, exemplarily but not restrictively, may be implemented by a memory card or a hard disc, and the compressed delay time tables may be updated according to actual needs. Therefore, the back-end circuit 140A of the ultrasound imaging system 100A has lower load of processing, and is applicable to the delay controller (such as CPU) which is power saving but has low efficiency. Main principles of the operation of FIG. 2 are similar to that of FIG. 1, and are not repeated here.

Figure 3:
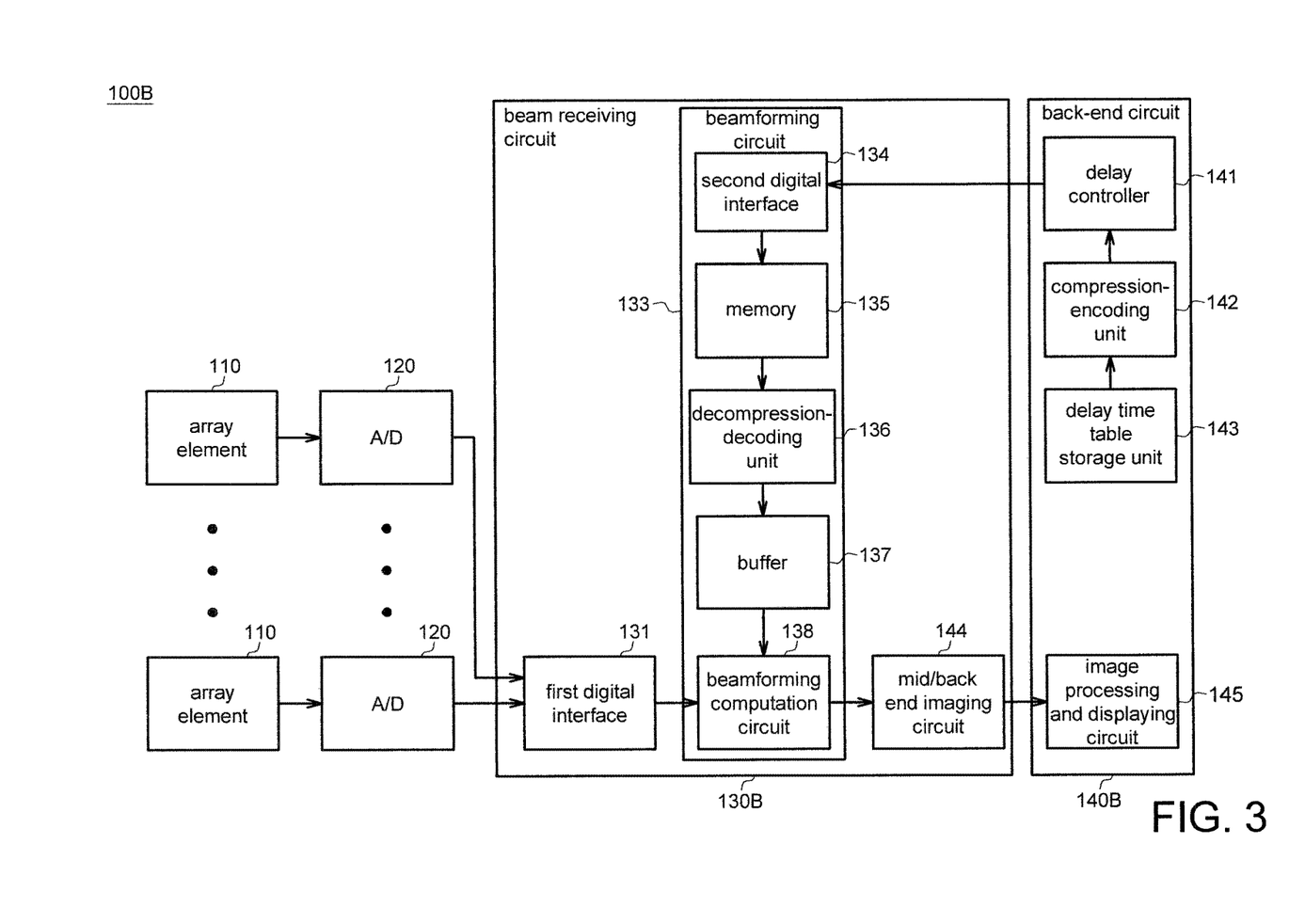
FIG. 3 is a functional block diagram of an ultrasound imaging system according to an alternate embodiment of the present disclosure.

Referring to FIG. 3, a functional block diagram of an ultrasound imaging system 100B according to an alternate embodiment of the present disclosure is shown. The ultrasound imaging system 100B of FIG. 3 is different from the ultrasound imaging system 100 of FIG. 1 in that the back-end circuit 140B does not include the mid/back end imaging circuit 144. That is, the mid/back end imaging circuit 144 is integrated in the beam receiving circuit 130B. Therefore, the back-end circuit 140B of the ultrasound imaging system 100B has lower load of processing, and is applicable to the delay controller (such as CPU) which is power saving but has low efficiency. Main principles of operation of FIG. 3 are similar to that of FIG. 1, and are not repeated here.

Figure 4:
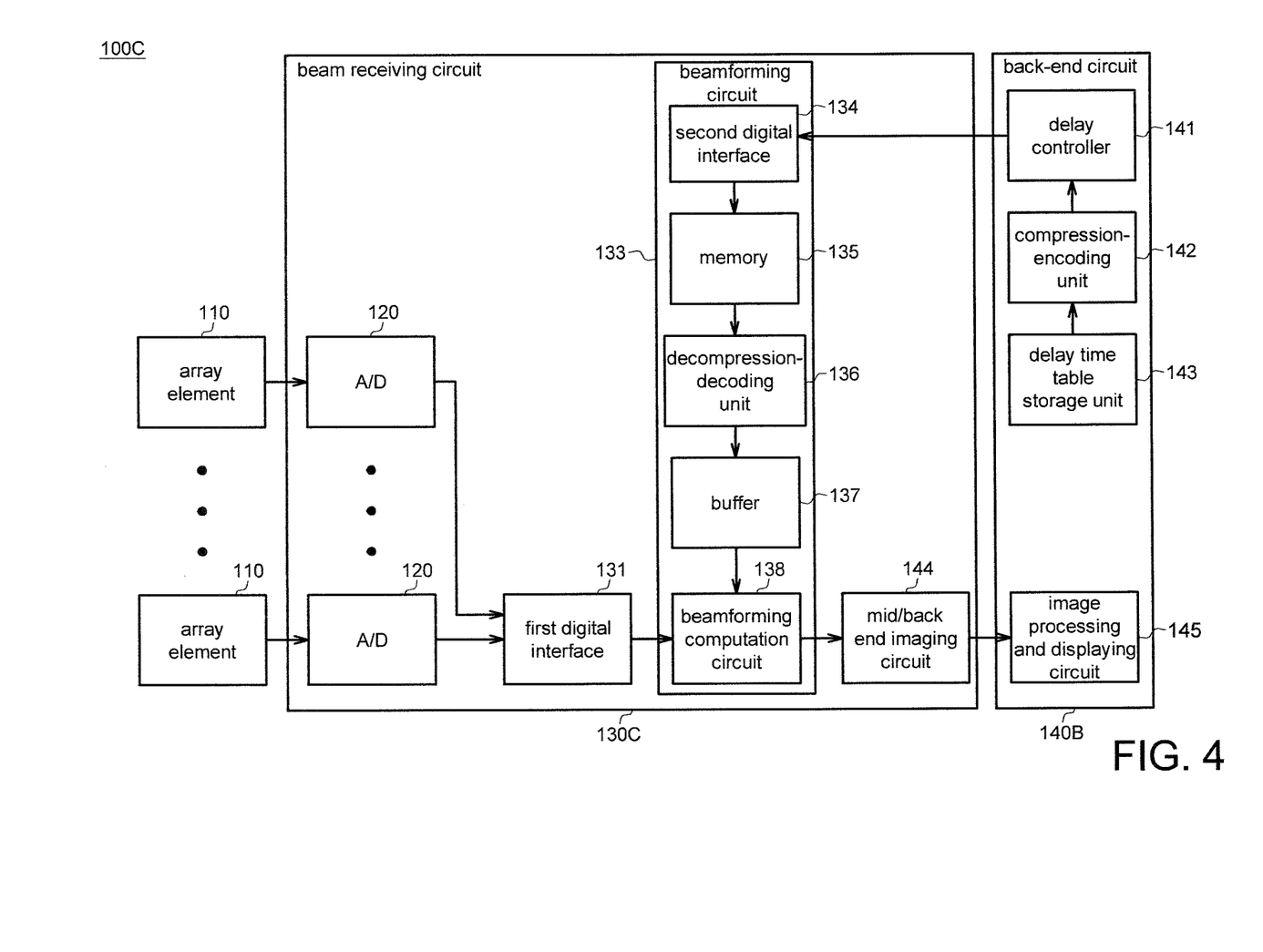
FIG. 4 is a functional block diagram of an ultrasound imaging system according to another alternate embodiment of the present disclosure.

Referring to FIG. 4, a functional block diagram of an ultrasound imaging system 100C according to another alternate embodiment of the present disclosure is shown. The ultrasound imaging system 100C of FIG. 4 is different from the ultrasound imaging system 100 of FIG. 1 in that the analog-to-digital converters 120 and the mid/back end imaging circuit 144 are integrated in the beam receiving circuit 130C. Main principles of operation of FIG. 4 are similar to that of FIG. 1, and are not repeated here.

In another embodiment of the present disclosure, an ultrasound beamforming method is disclosed. The delay time tables and/or imaging parameters which have been calculated in advance (off-line) are compressed and then are buffered in the buffer. When the array elements receive the echo signals, the compressed delay timing parameters buffered in the buffer are read and decompressed. Beamforming computation (such as DAS) is performed on the echo signals received by each channel to obtain an ultrasound beamforming value according to the decompressed delay timing parameters.

In an embodiment of the present disclosure, the delay time table is compressed by using lossless compression to avoid data compression error which may deteriorate ultrasound imaging quality. Also, in respect of hardware implementation, the decompression circuit may be implemented by simple hardware configuration which is low cost and power consumption.

In the delay time table, each data (that is, each delay timing parameter) includes an integer portion (such as 12 bits) and a decimal portion (such as 5 bits). The decimal portion represents interpolation which is based on the quality requirement of the design.

If each data of the delay time table includes an integer portion but does not have a decimal portion, each of the delay timing parameters includes 12 bits. Suppose the delay time table has 16 channels and the length of the channel is 2597. Based on the exemplification, the size of a time table is equivalent to 12*2597*16=498,624 (bits), which approximates 500K bits. If a plurality of focus points (for example, 10 points) are used, the data size will be 10 times larger.

Table 1 shows an exemplification of delay time table. The alphabets A, B, . . . represent the channels, and the numeric numbers 000, 001, 002, . . . represent the delay timing parameters corresponding to each channel at each time point.

TABLE 1

| | Number of delay timing parameters: 0, 1, . . . | | | |
|---|---|---|---|---|
| Number of channels: A, B, . . . | A000 B000 C000 . . . | A001 B001 C001 . . . | A002 B002 C002 . . . | . . . . . . . . . . . . |

The embodiments of the present disclosure may use differential pulse code modulation to compress the delay timing parameters. The delay timing parameters corresponding to each channel may be encoded individually. Each parameter is deducted by its previous parameter, for example, A001-A000, or A002-A001. Thus, the parameter larger than 1 will be coded as 0 or 1.

Thus, except for the first parameter, the remaining parameters may be coded in 1-bit as indicated in Table 2.

TABLE 2

| | Delay timing parameters | | | | |
|---|---|---|---|---|---|
| Channels | 12 bits | 1 bit | 1 bit | 1 bit | . . . |
| | 12 bits | 1 bit | 1 bit | 1 bit | . . . |
| | 12 bits | 1 bit | 1 bit | 1 bit | . . . |
| | . . . | . . . | . . . | . . . | . . . |

According to the compression example, the size of a time table is equivalent to (12+2596)*16=41,728 bits, which approximates 42 K bits. In comparison to the delay time table (about 500K bits) before compression, the size of the compressed data is reduced by $\frac{1}{12}$. The decompression of the differential pulse code modulation is very simple and may be implemented by a register and an adder.

Figure 5:
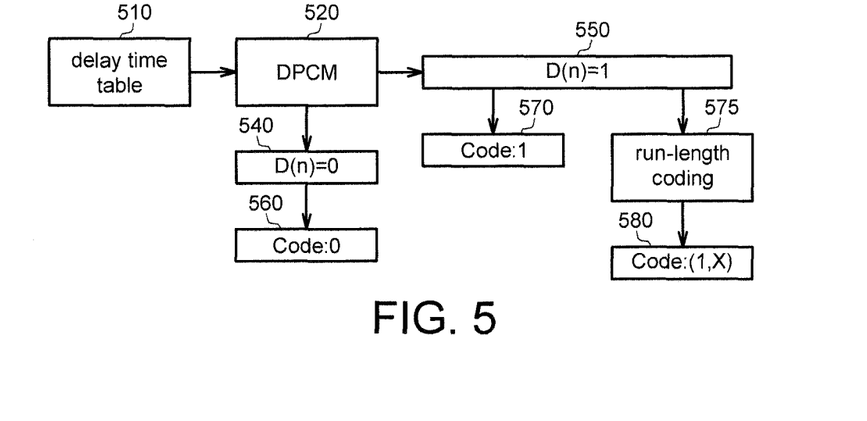
FIG. 5 is a schematic diagram of compressing delay timing parameters according to an embodiment of the present disclosure.

In the example below, the delay timing parameters are further compressed by using run-length coding, after differential pulse code modulation. FIG. 5 is a schematic diagram of compressing delay timing parameters according to an embodiment of the present disclosure. In step 520, the delay time table 510 is first encoded by the differential pulse code modulation (DPCM). Differential pulse code modulation modulates an original data O(n) into data D(n), wherein "n" represents the number of the n-th data in the delay time table (n is a positive integer). Part of Data D(n) is compressed as RL(m) by the run-length coding, wherein m represents that the number of the m-th data compressed by using run-length coding (m is a positive integer). When D(n)=0 (step 540), DPCM is applied to encode original data O(n). 1-bit length is used to encode D(n), and the coding result is 0, as shown in step 560. When D(n)=1 (step 550), a reference length parameter A_DP is set. For data which are n<A_DP (step 570), DPCM is applied to encode original data O(n), too. 1-bit length is used to encode D(n), and the coding result is 1. For later data (that is, n≥A_DP) (step 575), the run-length coding is further performed on D(n) to get RL(m), and then RL(m) is encoded by (1, X) (step 580), wherein X is an M-bit data for encoding the run-length, that is, RL(m)=(1, X). The encoding format is illustrated in Table 3. The A_DP and O(n) (n=1) of each channel are encoded, and subsequent data are encoded.

TABLE 3

| A_DP | (O(n), n = 1) | (Code (n), n = 2) | (Code (n), n = 3) | ... |
| --- | --- | --- | --- | --- |

Figure 6:
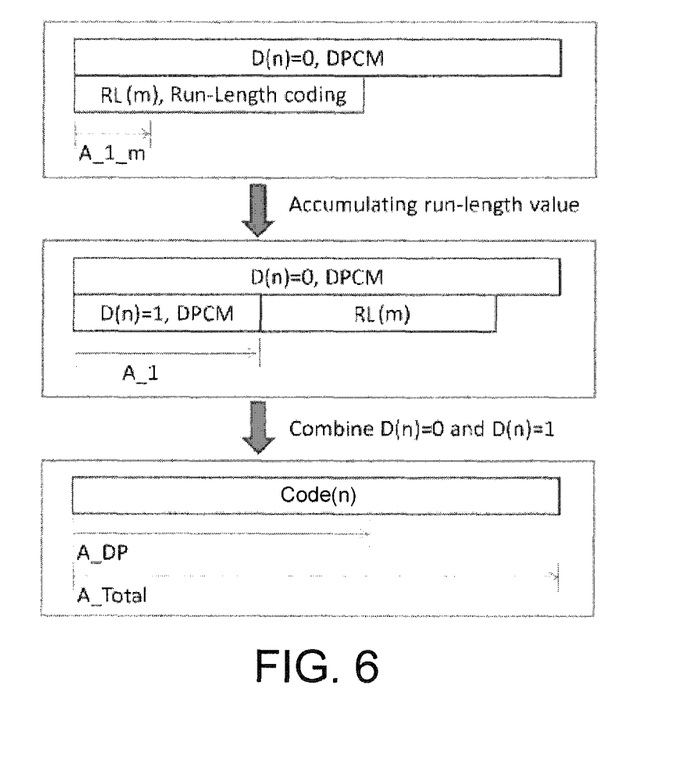
FIG. 6 shows the calculation of an accumulated data length reference parameter A_DP according to an embodiment of the present disclosure.

Usually, the encode data are consecutive data by time. FIG. 6 shows how to arrange encoded data into one consecutive code, and the calculation of the reference parameter A_DP according to an embodiment of the present disclosure. D(n)=0 and D(n)=1 are separated in the first step. In the second step, the run-length code RL(m) of all D(n)=1 are calculated, as shown in the top drawing of FIG. 6. For the run-length code RL(m) which is larger than bit length, it is suitable to be encoded by run-length coding. A length A_1_m is set to divide RL(m) into two groups. The run-length code RL(m) which matches m>A_1_m is encoded by run-length coding upon DPCM. The length value A_1 is calculated from A_1_m to represent division position for n-th data domain, and is calculated by accumulating run-length value which matches m<A_1_m. Therefore the encoded delay timing parameters are divided into three groups as shown in the center drawing of FIG. 6. Then, D(n)=0 and D(n)=1 are combined into one consecutive encoded delay timing parameters by index n, and the reference parameter A_DP is obtained. The complexity at the decompression end may be simplified by converting A_1 into A_DP. The parameter A_Total represents the total length of the delay timing parameters in each channel of the delay time table, and may be used for determining whether decompression on the delay timing parameters for the channel is completed. If yes, the subsequently received data is the compressed delay parameter for next channel.

Figure 7:
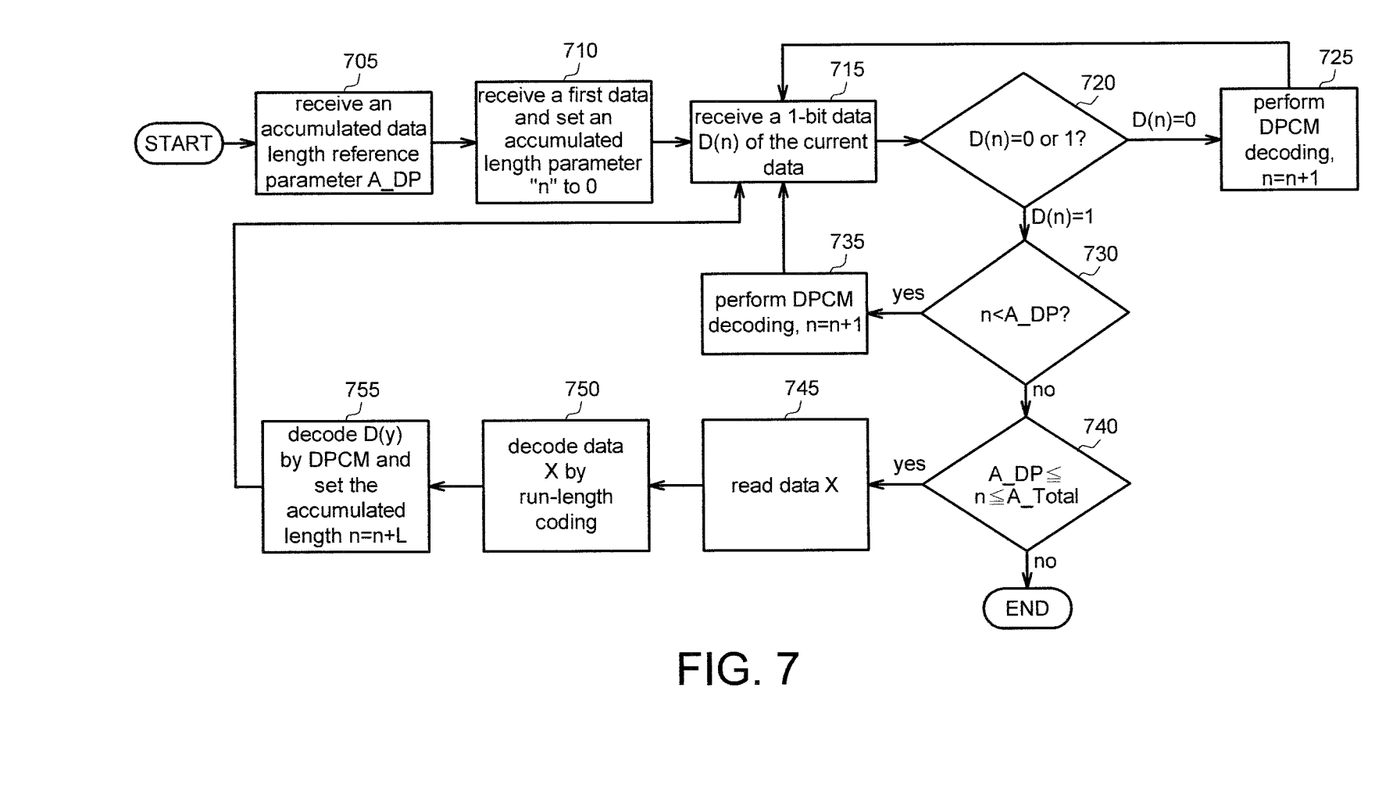
FIG. 7 is a flowchart of decoding a compressed delay time table according to an embodiment of the present disclosure.

FIG. 7 is a flowchart of decoding a compressed delay time table according to an embodiment of the present disclosure. In step 705, an accumulated data length reference parameter A_DP is received. In step 710, a first data is received, and an accumulated length parameter is set to 0. In step 715, a 1-bit data D(n) of the current data is received, wherein n has an initial value of 1. In step 720, whether D(n)=0 or 1 is determined. If D(n)=0, the method proceeds to step 725; and if D(n)=1, the method proceeds to step 730. In step 725, data is decoded by using DPCM, n is updated (n=n+1), and the method returns to step 715 for next encoding (when the method returns to step 715, the accumulated length is added by 1). When D(n)=1, whether n is smaller than A_DP is determined in step 730. If n<A_DP in step 730, the method proceeds to step 735; otherwise, the method proceeds to step 740. In step 735, data is decoded by using DPCM, n is updated (n=n+1), and the method proceeds to step 715 to continue with next encoding (the accumulated length is added by 1 if the method returns to step 715). If n>A_DP, in step 740, whether n is larger than A_DP but smaller than A_Total is determined. If yes in step 740, an M-bit data X is read (step 745) and data X is decoded by using run-length coding (step 750), and in step 755, D(y) is decoded by using DPCM and the accumulated length n is updated (n=n+L). That is, D(y)=1, y=n~n+L, wherein L represent a decoded run-length. After the step 755 is completed, the method returns to step 715 to receive the next bit. If the determination in step 740 is negative, this indicates that decompression of the delay timing parameters for this channel is completed, and the method may decompress the delay timing parameters of the next channel.

In the above compression example, the size of the time table is 6684 bits, which is further reduced by about ⅙ compared to DPCM. Since the lengths of the compressed data for each channel are not the same, it is a feasible solution to connect all channel data in serial to form one single memory space. Since the length of differential pulse coding may vary with the delay time table, a larger memory space may be used to increase the flexibility in response to different delay time tables (after encoding, the encoded data for each delay time table will be different). If the memory space is 10, 240 bits, the data size is reduced to ¼.

The run-length coding decompression may be easily implemented by hardware. The required hardware is such as a counter, a multiplexer, a buffer and a comparer, and the details are not repeated here.

The data size and the refresh rate of the delay time table are related to the ultrasound imaging configuration. Conventional ultrasound technology adopts linear scan in which the delay time table of each scan line is the same. Therefore, the delay time table for each scan line is loaded once the scan mode is changed and there is no need to change the delay time table henceforward. In order to obtain clear images at different depths, a plurality of focus points are used at the same time. For example, multi-zone focusing technology which requires several delay time tables is used. Since the delay time table may vary with the part of the body to be examined and the type of probe, several delay time tables are required. In an embodiment of the application, the compression of the delay time table helps to reduce memory space, and the delay time tables may be loaded at the same time without occupying too much memory space.

In respect of differential pulse code modulation, the required memory size for saving 10 delay time tables reduces to about 420 Kbits from about 5 Mbit. When the differential pulse code modulation and the run-length coding are both used, the required memory size further reduces to about 10.3 Kbits. Since current technology normally employs 32 channels or 64 channels, the reduction in data size will bring about huge impact.

In recent ultrasound technology, such as phase array ultrasound technology, the delay time table for each scan line is not the same, and tens of delay time tables corresponding to the scan lines are stored. If the delay time table for each scan line is updated, the refresh rate per second is equivalent to the frame rate of the image multiplied by the total number of scan lines. Pulse repetition frequency (PRF), which represents the maximum value of the ultrasound scan frequency, has much to do with the scan depth. If the scan depth is 5 cm, the PRF is 15400 Hz. This means that the frame refresh rate is 15400 per second, and the data size of the delay time table must be very small under this refresh rate (15400 per second).

The required memory spaces are illustrated with an example in which 128 element probes, 16 channels, 113 scan lines are used. When phase array technology is used, the memory size required for storing the time tables and the bit rate in updating the delay time tables are illustrated in Table 3.

TABLE 3

| Compression method | Memory size (for storing all time tables) | Bit rate (for continually updating the delay time table) |
| --- | --- | --- |
| No compression | about 56.4 Mbits | about 7.68 Gbits/s |
| Differential pulse code modulation | about 4.7 Mbits | about 643 Mbits/s |
| Both Differential pulse code modulation and Run-length coding | about 1.16 Mbits | about 158 Mbits/s |

As indicated in Table 3, when the phase array technology is used, the size of uncompressed delay time tables is too large, and it is unpractical to store all delay time tables to the memory. However, if other two methods are used, all delay time tables may be stored in the memory. In respect of the transmission bit rate, if the delay time tables are not compressed, the required bit rate are too high and thus a high speed transmission circuit is needed, such as PCIE (Peripheral Component Interconnect Express) circuits. If so, power consumption and hardware cost of the high speed transmission circuit are too high and thus unpractical. However, if the delay time tables are compressed, the required bit rate will be lower and the implementation will be easier. In respect of the differential pulse code modulation, 16 pins may be used for transmission, and the transmission clock for each pin is higher than 41 MHz. If both differential pulse code modulation and run-length coding are used at the same time, one single pin whose transmission clock is larger than 200 MHz would be enough. If 4 pins are used for transmission, the transmission clock for each pin needs to be higher than 50 MHz. It is easy to transmit data in 50 MHz clock rate between two ICs.

The above disclosure shows that if the delay time tables are compressed, the memory size required for storing the delay time tables may be largely reduced. Moreover, since the amount of data for transmission is reduced, the transmission load of the hardware and/or ASIC may be largely reduced. According to the embodiments of the present disclosure, the delay time tables may be continually updated. The upper limit of data transmission per second of the ASIC is equivalent to the clock cycle multiplied by the number of pins. In general, the upper limit of clock cycle is fixed and is subjected to the manufacturing process, and high clock cycle will increase power consumption and the design complexity of the circuit board. Therefore, in current technology, high data transmission may be achieved by using a large number of pins. In prior art, uncompressed delay time tables have large data size and the transmission of uncompressed delay time tables requires a larger number of pins. To the contrary, in an embodiment of the present disclosure, the delay time tables are compressed and the data size of the compressed delay time tables is greatly reduced, and transmission of the compressed delay time tables may require one single pin. Further, transmission of the compressed delay time tables and transmission of other parameters may share the same pin. Therefore, compression of the delay time tables according to the embodiments of the present application helps to reduce the number of pins and the transmission clock cycle, and accordingly reduce power consumption.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An ultrasound imaging system, comprising:
a beam receiving circuit for receiving a plurality of digitized echo signals; and
a back-end circuit coupled to the beam receiving circuit for outputting a plurality of compressed delay timing parameters corresponding to a plurality of channels to the beam receiving circuit;
wherein,
before the ultrasound imaging system is booted, at least one delay time table is stored in the back-end circuit;
after the ultrasound imaging system is booted, one or more of the at least one delay time table or a part of the at least one delay time table are compressed by the back-end circuit, transmitted and loaded to the beam receiving circuit;
the beam receiving circuit decompresses the plurality of compressed delay timing parameters into a plurality of delay timing parameters, and processes the plurality of digitized echo signals into an ultrasound beamforming value according to the plurality of delay timing parameters corresponding to the plurality of channels; and
the back-end circuit generates an ultrasound image according to the ultrasound beamforming value outputted from the beam receiving circuit.

2. The ultrasound imaging system according to claim 1, further comprising:
a plurality of array elements corresponding to the plurality of channels for receiving a plurality of analog echo signals reflected from an object; and
a plurality of converters for converting the plurality of analog echo signals into the plurality of digitized echo signals and transmitting to the beam receiving circuit.

3. The ultrasound imaging system according to claim 2, wherein, the beam receiving circuit includes:
a first digital interface for receiving the plurality of digitized echo signals transmitted from the plurality of converters; and
a beamforming circuit, comprising:
a second digital interface for receiving the plurality of compressed delay timing parameters transmitted from the back-end circuit;
a first memory for buffering the plurality of compressed delay timing parameters transmitted from the second digital interface;
a decoder for decompressing and decoding the plurality of compressed delay timing parameters buffered in the first memory into the plurality of delay timing parameters;
a second memory for buffering the plurality of delay timing parameters decompressed and decoded by the decoder; and
a beamforming computation circuit for performing beamforming computation on the plurality of digitized echo signals to obtain the ultrasound beamforming value according to the plurality of delay timing parameters corresponding to the plurality of channels.

4. The ultrasound imaging system according to claim 1, wherein, the back-end circuit includes:
a mid/back end imaging circuit for converting the ultrasound beamforming value obtained by the beam receiving circuit into an image signal; and
an image processing and displaying circuit for performing image processing on the image signal obtained by the mid/back end imaging circuit and displaying the ultrasound image.

5. The ultrasound imaging system according to claim 1, wherein, the back-end circuit includes:
a delay time table storage unit for storing the at least one delay time table;
an encoder for compressing the at least one delay time table buffered in the delay time table storage unit into the plurality of compressed delay timing parameters; and
a delay controller for controlling the delay time table storage unit to output the at least one delay time table to the encoder, and transmitting the plurality of compressed delay timing parameters compressed by the encoder to the beam receiving circuit.

6. The ultrasound imaging system according to claim 1, wherein, the back-end circuit includes:
   a compressed delay time table storage unit for storing the plurality of compressed delay timing parameters; and
   a delay controller for controlling the compressed delay time table storage unit to output the plurality of compressed delay timing parameters to the beam receiving circuit.

7. The ultrasound imaging system according to claim 1, wherein,
   the beam receiving circuit includes a mid/back end imaging circuit converting the ultrasound beamforming value into an image signal; and
   the back-end circuit includes an image processing and displaying circuit performing image processing on the image signal obtained by the mid/back end imaging circuit and displaying the ultrasound image.

8. The ultrasound imaging system according to claim 2, wherein, the plurality of converters are integrated in the beam receiving circuit.

9. A beamforming circuit comprising:
   a digital interface for receiving a plurality of compressed delay timing parameters transmitted from a back-end circuit;
   a first memory for buffering the plurality of compressed delay timing parameters transmitted from the digital interface;
   a decoder for decompressing and decoding the plurality of compressed delay timing parameters buffered in the first memory into a plurality of delay timing parameters;
   a second memory for buffering the plurality of delay timing parameters decompressed and decoded by the decoder; and
   a beamforming computation circuit for performing beamforming computation on a plurality of digitized echo signals according to the plurality of delay timing parameters corresponding to a plurality of channels, to obtain an ultrasound beamforming value.

10. An ultrasound beamforming method for an ultrasound imaging system having a back-end circuit, the ultrasound beamforming method comprising:
    when a plurality of array elements receive a plurality of digitized echo signals, reading a plurality of compressed delay timing parameters which is pre-stored from a memory and decompressing the plurality of compressed delay timing parameters into a plurality of delay timing parameters;
    performing beamforming computation on the plurality of digitized echo signals received by the plurality of array elements to obtain an ultrasound beamforming value according to the plurality of delay timing parameters; and
    converting the ultrasound beamforming value into an image signal and performing image processing on the image signal to display an ultrasound image;
    wherein
    before the ultrasound imaging system is booted, at least one delay time table is stored in the back-end circuit;
    after the ultrasound imaging system is booted, one or more of the at least one delay time table or a part of the at least one delay time table are compressed by the back-end circuit as the plurality of compressed delay timing parameters.

11. The ultrasound beamforming method according to claim 10, further comprising:
    pre-storing the plurality of compressed delay timing parameters in a compressed delay time table storage unit; and
    reading the plurality of compressed delay timing parameters from the compressed delay time table storage unit and transmitting to the memory.

12. The ultrasound beamforming method according to claim 10, further comprising:
    pre-storing an uncompressed time table in a delay time table storage unit; and
    reading the uncompressed time table from the delay time table storage unit according to the plurality of array elements, compressing the uncompressed time table into the plurality of compressed delay timing parameters and transmitting to the memory.

13. An ultrasound imaging system, comprising:
    a plurality of array elements corresponding to a plurality of channels for receiving a plurality of analog echo signals reflected from an object;
    a plurality of converters for converting the plurality of analog echo signals into a plurality of digitized echo signals;
    a beam receiving circuit for receiving the plurality of digitized echo signals from the plurality of converters; and
    a back-end circuit coupled to the beam receiving circuit for outputting a plurality of compressed delay timing parameters corresponding to the plurality of channels to the beam receiving circuit;
    wherein,
    the beam receiving circuit decompresses the plurality of compressed delay timing parameters into a plurality of delay timing parameters, and processes the plurality of digitized echo signals into an ultrasound beamforming value according to the plurality of delay timing parameters corresponding to the plurality of channels; and
    the back-end circuit generates an ultrasound image according to the ultrasound beamforming value outputted from the beam receiving circuit;
    the beam receiving circuit includes:
      a first digital interface for receiving the plurality of digitized echo signals transmitted from the plurality of converters; and
      a beamforming circuit, comprising:
        a second digital interface for receiving the plurality of compressed delay timing parameters transmitted from the back-end circuit;
        a first memory for buffering the plurality of compressed delay timing parameters transmitted from the second digital interface;
        a decoder for decompressing and decoding the plurality of compressed delay timing parameters buffered in the first memory into the plurality of delay timing parameters;
        a second memory for buffering the plurality of delay timing parameters decompressed and decoded by the decoder; and
        a beamforming computation circuit for performing beamforming computation on the plurality of digitized echo signals to obtain the ultrasound beamforming value according to the plurality of delay timing parameters corresponding to the plurality of channels.

* * * * *